Sept. 20, 1971  E. F. SETTE  3,605,796
GATE VALVE WITH TORSION ADJUSTMENT
Filed Dec. 11, 1969  2 Sheets-Sheet 2
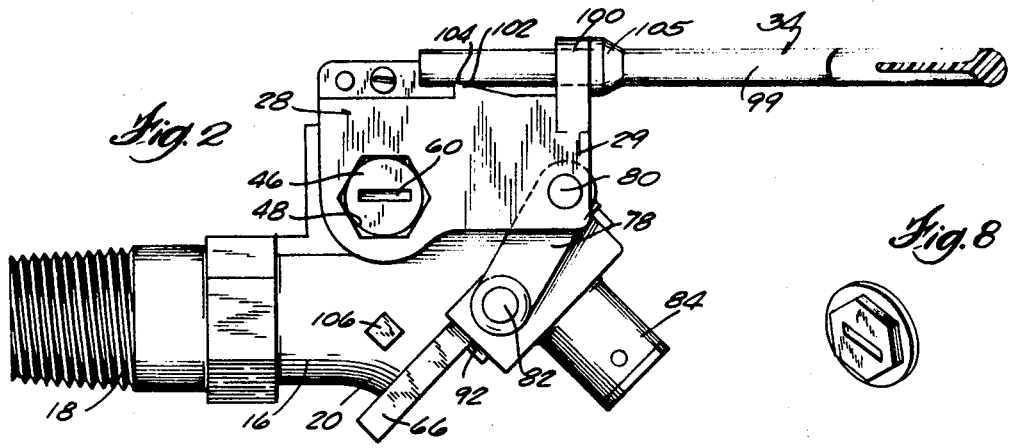
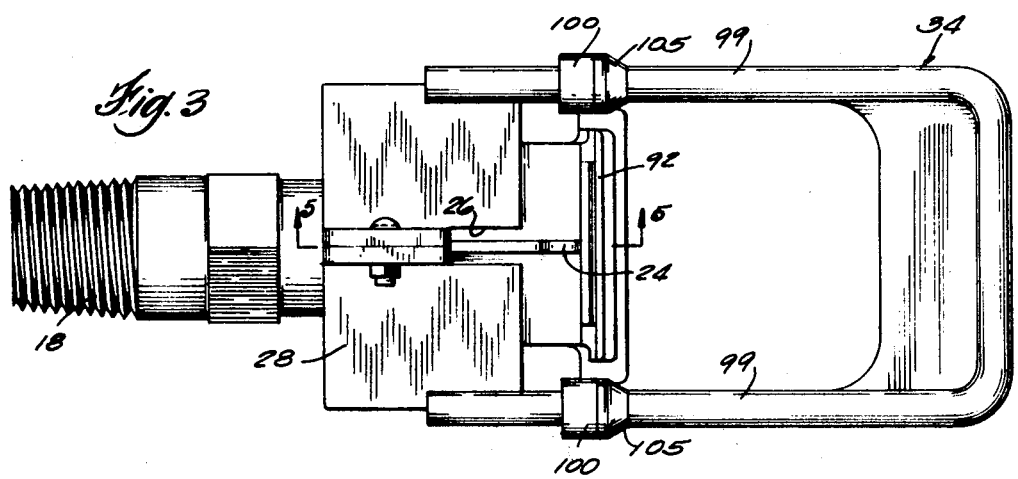
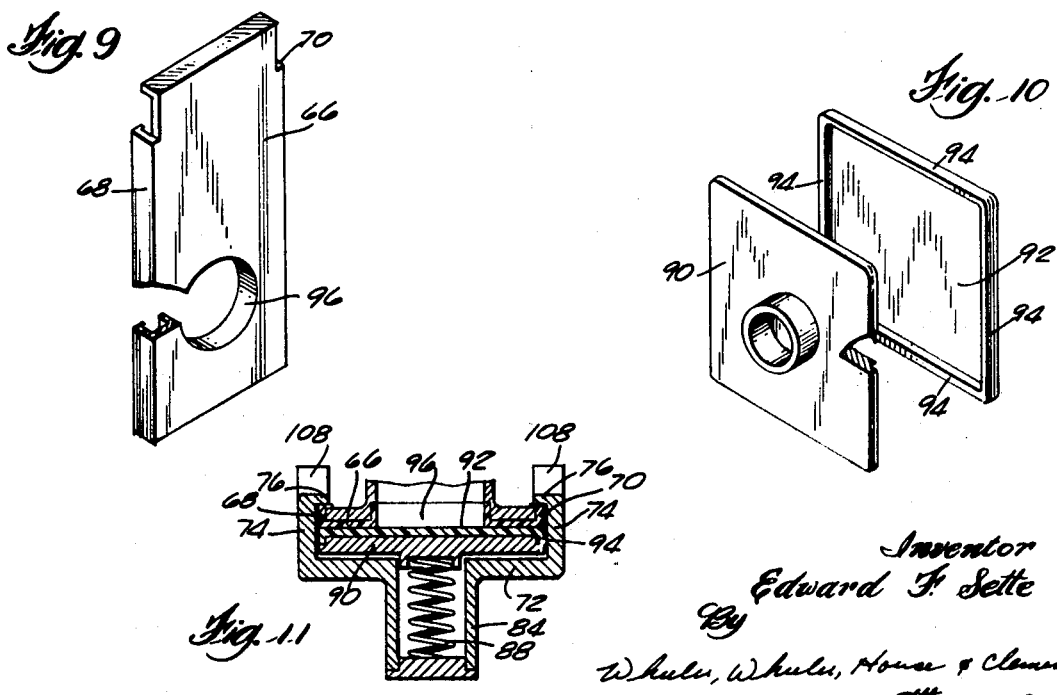
Inventor
Edward F. Sette
By
Wheeler, Wheeler, House & Clemency
Attorneys

United States Patent Office 3,605,796
Patented Sept. 20, 1971

1

3,605,796
GATE VALVE WITH TORSION ADJUSTMENT
Edward F. Sette, Oakland, Calif., assignor to Sette
Products Co., Oakland, Calif.
Filed Dec. 11, 1969, Ser. No. 884,195
Int. Cl. F16k 3/04
U.S. Cl. 137—385          8 Claims

ABSTRACT OF THE DISCLOSURE

A slideable valve gate carries a spring pressed closure provided with a sheet resin facing which abuts a complementary ported facing on a way provided by the valve casing. An upstanding web on the valve casing has an integral transverse bearing by which a boxlike lever is pivoted to the casing, such lever having linkage connecting it with the valve gate. Springs centrally anchored to and projecting oppositely from the aforesaid web are adjustably connected at their ends to the boxlike lever by polygonal elements adjustable in the lever for varying spring tension. A fin projecting upwardly from the web is apertured to receive a lock, said fin projecting through a slot in the boxlike lever so that when the lock is in place the valve cannot be opened.

The lever has a U-shaped handle for the legs of which it provides separate openings beyond which the lever has dog portions engaged with notches in the legs of the handle for retaining the handle in assembly with the lever.

BACKGROUND OF INVENTION

Cross reference is made to my application entitled Gate Valve, filed Aug. 1, 1968, Ser. No. 749,455, now Pat. No. 3,559,947.

The valve member has pressure engagement with the facing of the ported way as it slides reciprocably across the valve port. Slide valves are old, being shown, for example, in Ward 139,693 and Ball 829,316. In this respect, therefore, the device of the present invention is novel only in detail. However, the arrangement for the pivoting and adjustable torsioning of the valve operating lever provides an extremely simple, inexpensive and effective structure believed to present broad novelty.

SUMMARY OF INVENTION

The invention has several features, one of which has to do with the specific arrangement by which the valve member is spring pressed from its slide toward a valve seat provided by a ported ply of synthetic resin mounted on the valve casing.

The valve casing is a die casting which, above the delivery passage, is provided with an upwardly projecting web which supports and positions the valve seat during reciprocal movement of the valve slide. Such movement is controlled by linkage from a boxlike lever disposed symmetrically with regard to the aforesaid web and having within it torsion springs anchored at their ends to the web and projecting oppositely within sleeves integral with the web and upon which the lever is pivoted. The spring ends are connected with the lever through spring seat elements upon which the springs exert axial as well as torsional pressure. Each such seat element has at its end a polygonal exterior surface for which the lever has a complementary socket. Inwardly of each such surface each seat element

2 has a circular collar or flange rotatable in a bore of the lever to permit the respective elements to be rotated with a screwdriver when pushed inwardly in axial opposition to the spring thrust to disengage its polygonal portion from the polygonal seat of the lever. The polygonal portion of the anchorage element and the complementary polygonal margin of the opening in the lever are symmetrical in the sense that interlocking engagement between the element and the lever is possible in any one of a plurality of relatively rotated positions of the element. By this means the adjustment of spring torque is very simply effected.

Between the links which connect the lever with the valve slide, the lever has a central slot through which projects an ear of the aforesaid web. This ear aperture receives a padlock hasp to prevent the valve from being opened without authority.

To facilitate manipulation of the lever, it is preferably elongated by provision of a handle that may comprise a U-shaped member having shouldered legs engaged through laterally spaced openings in the top of the lever, each such leg having a notch sprung into engagement over a dog which is integral with the lever in line with the respective opening.

BRIEF DESCRIPTION OF DRAWINGS

FIG. 2 is a view similar to FIG. 1 showing the parts as they appear when the valve is in open position.

FIG. 3 is a plan view of the closed valve, looking toward the plane of the handle.

FIG. 8 is a view which shows in perspective one of the spring seat elements adjustable for regulating spring torsion on the lever.

FIG. 9 is a view in perspective of the valve body face plate which provides a seat about the port.

FIG. 10 is a view in perspective of the valve slide and its face plate in relatively separated positions.

FIG. 11 is a view taken in section on line 11—11 of FIG. 5.

DETAILED DESCRIPTION

Figure 1:
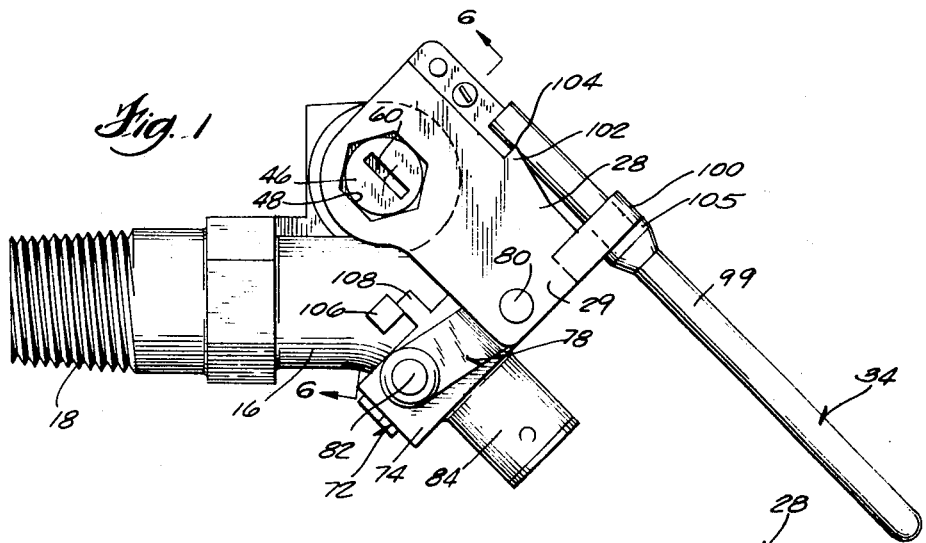
FIG. 1 is a view in side elevation of a valve embodying the invention, the valve being shown in closed position.
Figure 7:
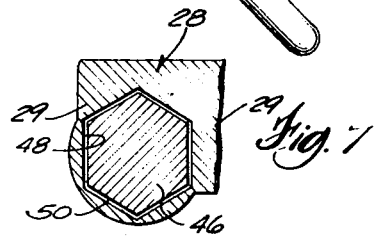
FIG. 7 is a detail view taken in section on the line 7—7 of FIG. 6.
Figure 5:
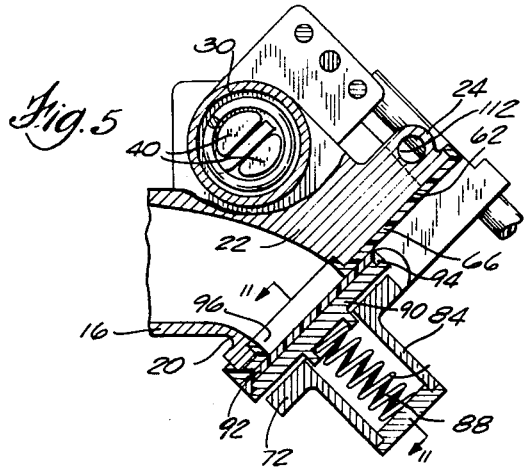
FIG. 5 is a view taken in section on the line 5—5 of FIG. 3.
Figure 4:
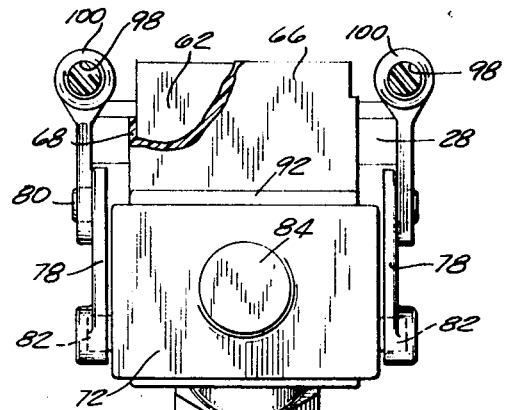
FIG. 4 is a view of the valve in elevation looking toward the plane of the valve slide.

The valve casing 16 has a threaded spud portion 18 and a delivery passage portion 20 from which a central web 22 projects upwardly, having an ear 24 that extends through a slot 26 in a boxlike valve operating lever 28.

As will be shown hereinafter, the web 22 is integral with, and at right angles to, an elongated valve seat member which guides the valve slide.

Figure 6:
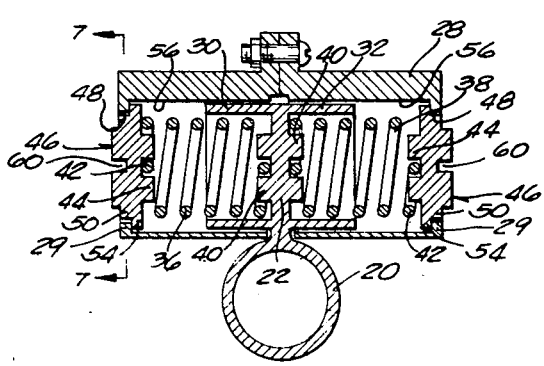
FIG. 6 is a view taken in section on the line 6—6 of FIG. 1.

Integral with the aforesaid web 22 are oppositely projecting sleeves 30 and 32 providing a transverse axis upon which the boxlike lever 28 may be oscillated subject to the control of the handle 34 and combined compression and torsion springs 36 and 38. These springs are disposed within the respective sleeves 30 and 32 and are anchored to the web by means of lugs 40 with which the web 22 is provided as shown in FIG. 6. The outer end 42 of each spring is secured between lugs 44 in the spring seat elements 46, these being adjustable rotatably as hereafter explained, whereby torsion is communicated from the respective springs to the opposite sides of the boxlike lever 28.

In each outer wall 29 of lever 28 there is a polygonal opening 48 with which a complementary polygonal terminal portion 50 of each of the elements 46 is engaged under axial spring bias. The polygonal form of the opening 48 and the complementary form of the terminal portion 50 of the element 46 are symmetrical with at least certain faces of equal length and radius and equal intervening angles, said faces being at least in sufficient number so that the respective elements may be engaged with the lever in any one of a plurality of rotatably differing positions. As shown, the parts are hexagonal. Offset inwardly from the polygonal portions 50 of the respective elements 46, such elements have integral collars 54 which are rotatably fitted within surfaces 56 concentric with the axis of the respective springs. Each of the elements 46 is provided with a screwdriver slot 60 in its outer face. A screwdriver inserted in this slot may be used, first, to push the element inwardly against the axial bias of its spring and thereby to disengage its polygonal portion 46 from the polygonal portion of the lever. Guided by the circular collar 54 rotating in surface 56 of the lever, the element 46 may then be rotated in a direction to increase or decrease the torsion of the spring. When axial thrust of the screwdriver is released, the element 46 will snap back subject to axial expansion of the spring to re-engage the terminal portion of the element 46 in the polygonal opening of the lever. This will fix its position against further rotation, thereby again transmitting the adjusted spring torsion to the lever.

The valve seat 62 which surrounds port 20 at the delivery end of casing 16 is elongated to guide the slide valve and has a facing 66 of synthetic resin such as nylon. Seat 62 is integral with the valve casing and is braced by its integral connection at right angles to the upstanding web 22. The facing 66 has flanges at 68 and 70 which engage the ends of the seat 62 to secure the facing against movement with the valve slide. For opening and closing the valve, the slide 72 is reciprocable along the extension valve seat 62, being connected therewith by side flanges 74 having hook-shaped extensions 76 behind the seat portion 62 of the valve casing. At each side of the valve, links 78 connect the lever 28 with the slide 74, each link being pivoted to the lever at 80 and to the slide 82.

The slide 72 is provided with a spring housing 84 to which is removably threaded a cap for confining a compression spring 88 which urges valve closure 90 toward the facing 66 on seat portion 62 of the casing. The closure 90 has a preformed facing 92 with lateral flanges at 94 engaging it with the closure member 90 so that the closure member, with its facing, operates as a unit with the slide 72 when the slide is reciprocated across the port 96 in the facing member 66 of the seat. The facing 92 of the closure member engages the seat facing 66 and may be made of a complementary synthetic resin such as nylon.

Raising the lever 28 upon its fulcrum above described will cause the slide 72 to move upwardly on facing member 66 until the closure element 90 uncovers the port 96. For convenience of manipulation, the U-shaped handle 34 provides an extension of the lever 28. The respective legs 99 of the handle project through apertured ears 100 with which the lever 28 is provided. Beyond and aligned with these ears the lever 28 has integral projecting dogs 102 which are engaged in the notches 104 of the respective legs 99. The handle is prefabricated. Its legs 99 have sufficient resilience so that when the legs are pushed through the apertures of the respective ears 100 the notched portions of the legs will engage over the dogs to maintain the assembly as above described. Stop flanges 105 limit the inward movement of the respective legs by engagement with the respective ears.

The lever 28 is bifurcated to provide a slot 110 through which the flange 24 projects when the lever is in the normal position in which the valve port is closed by the closure member. The opening 112 in the flange 24 is adapted to receive the hasp of a conventional padlock which prevents upward movement of the lever, thus securing the valve against unauthorized opening.

Complementary stop studs 106 and 108 on the valve body 16 and slide 72 engage in the closed position of the valve as shown in FIG. 1 to limit further movement of the slide following valve closing.

I claim:

1. A valve comprising the combination of a valve casing having a delivery passage and port, a valve slide for controlling the opening of said port, means for providing a way upon which said slide is reciprocable between port opening and port closing positions, a lever fulcrumed to said casing and comprising a boxlike enclosure sttructure, means connecting said lever with said slide, and torsion spring means connected between said casing and said lever and disposed within the boxlike lever structure.

2. A valve according to claim 1 in which the lever is bifurcated and said casing has a flange which extends through the bifurcated lever and has a lock-opening normally above the lever.

3. A valve according to claim 2 in which the torsion spring means comprises a pair of springs each of which is connected with said flange intermediate the sides of the lever, the outer end of each spring being adjustably rotatable with respect to the lever for controlling the torsion exerted by the spring on the lever.

4. A valve according to claim 3 in which the adjustable connection of each spring with the lever comprises a spring anchorage element rotatable with the spring on the axis of the spring and provided with a polygonal terminal portion for which the lever has a complementary polygonal opening, the element being held releasably in such opening by axial bias of said spring and being disengageable from the opening by inward thrust against such bias, whereupon the element may be rotated with respect to the lever before being re-engaged in a different position in said opening.

5. A valve according to claim 1 in which said lever has a prefabricated handle extension of U-shaped form having legs in sockets with which the lever is provided.

6. A valve according to claim 5 in which each of the legs in the handle projects through its respective socket and is provided with a notch for which the lever is provided with a pawl engaged in the notch to retain the handle in position on the lever.

7. A gate valve comprising a valve slide, a casing having a ported way along which the slide is operable between port opening and port closing positions, a valve lever having linkage connecting it with said slide and having means pivotally connecting it with said casing, torsion spring means acting on said lever for moving the slide along the way toward its port closing position, the torsion spring means including a helical spring which develops axial thrust as well as torque, means for connecting one end of said spring to said valve casing, and an anchorage element for the other end of said spring which element has a rotatably adjustable connection with said lever, said rotatably adjustable connection including means for securing it in adjustment under the bias of the axial thrust of said spring.

8. A gate valve according to claim 7 in which said adjustable connection comprises an anchorage element engaged by the end of the spring and subject to torsion and axial pressure of said spring, an opening with a polygonal margin being provided in the lever and said anchorage element having a complementary polygonal portion engaged in said opening under the compression bias of said spring and being releasable from said opening against said compression bias for rotative adjustment with respect to the lever and re-engagement in said opening in a different position for transmission of spring torque to the lever.

References Cited

UNITED STATES PATENTS

| | | | |
|---|---|---|---|
| 845,260 | 2/1907 | Raphiel | 251—203X |
| 1,384,540 | 7/1921 | Reeves | 251—147X |
| 1,482,986 | 2/1924 | Grimes | 251—147 |
| 2,337,817 | 12/1943 | Hertrick | 251—176X |
| 3,292,898 | 12/1966 | Willman | 251—368 |

FOREIGN PATENTS

| | | | |
|---|---|---|---|
| 549,575 | 4/1932 | Germany | 251—147 |

HAROLD W. WEAKLEY, Primary Examiner

U.S. Cl. X.R.

251—147, 176, 203